United States Patent [15] 3,669,891
Greenwood et al. [45] June 13, 1972

[54] CHEMICAL COMPOSITIONS

[72] Inventors: John Malcolm Greenwood, Arlington, Mass.; David Howard Stokes, Llanllwch, Carmarthen, Wales

[73] Assignee: Lever Brothers Company, New York, N.Y.

[22] Filed: May 27, 1970

[21] Appl. No.: 41,105

[30] Foreign Application Priority Data

May 30, 1969 Great Britain ........................27,463/69

[52] U.S. Cl. ..............................252/90, 252/186, 252/188.3, 252/408, 252/95
[51] Int. Cl. .......................................................C11d 17/00
[58] Field of Search....................252/90, 186, 188.3, 408, 95

[56] References Cited

UNITED STATES PATENTS 2,420,286 5/1967 Lacey et al. ..........................252/188.3
3,564,588 2/1971 Soli......................................252/188.3

*Primary Examiner*—John D. Welsh
*Attorney*—Louis F. Kline, Jr., Melvin H. Kurtz and Edgar E. Ruff

[57] ABSTRACT

Cleansing compositions adapted to emit visible light during use, and which are thereby capable of conveying useful information to the user, are disclosed.

10 Claims, No Drawings

CHEMICAL COMPOSITIONS

The present invention relates to cleansing compositions. The invention provides cleansing compositions that contain one or more chemical compounds that engage in a chemiluminescent reaction under the conditions of use of the compositions, which reaction provides the compositions with visual signalling characteristics. These visual signalling characteristics facilitate the utilization of the compositions.

The primary function of the compositions of the invention is to cleanse, and not to produce light; thereby they are distinguished from chemiluminescent compositions hitherto described. The expression "cleansing composition" is used herein to encompass all types of composition that can be employed to give a cleansing effect, such as fabric washing compositions, personal washing compositions, shampoos, hard surface cleaning compositions, bleaching compositions, scourers, polishes, air fresheners, disinfectant compositions and insecticidal compositions.

Chemiluminescence is essentially a transitory phenomenon, as it arises during chemical change. It may be described as the emission of radiation, occurring due to any cause other than high temperature, produced by chemical action. A review of the phenomenon of chemiluminescence is contained in chapter 3 of "Light: Physical and Biological Action" (Seliger and McElroy, Academic Press, 1965). In order for a chemical reaction to generate chemiluminescence, two requirements must be satisfied. Firstly, sufficient energy must become available in a single step during the chemical reaction to leave a product molecule or intermediate molecule in an electronically excited state. Secondly, the product or intermediate molecule must be capable of emitting visible radiation so that de-activation by fluorescence is a probable event, in which case direct chemiluminescence is obtained, or else efficient energy transfer must occur between the excited product molecule or intermediate molecule and a fluorescent species, which fluorescent species then emits visible radiation, giving rise to sensitized chemiluminescence. Although the phenomenon of chemiluminescence encompasses the emission of a wide range of visible and invisible radiation, in the present specification the term "chemiluminescence" is hereafter used solely to mean the emission of visible radiation.

For a chemical reaction to generate chemiluminescence, a product molecule or intermediate molecule must be produced in an electronically excited state. A large number of processes have been recognized as a source of suitable excited state species. For example, electron removal from a radical anion, the addition of an electron to a radical cation, or the reduction of charge-transfer products may all yield excited state species. Particularly intense chemiluminescence may be obtained during reactions which involve the rupture of oxygen—oxygen bonds in cyclic peroxide intermediates.

Chemiluminescent compounds have been employed in temporary marking compositions which have found great utility in search and rescue operations conducted at night. The compounds usually employed for this function are those which chemiluminesce by the action of air oxidation, one of the most commonly used being tetrakis(dimethylamino)ethylene (I).

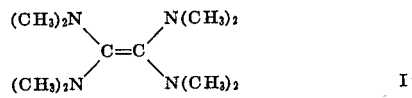

I

The rate of oxidation of such compounds is controlled by incorporating them into wax based solids and gels, where the oxidation reaction is dependent on the rate of diffusion of oxygen through the composition. Certain of these compositions have been formulated such that oxidation of the surface material produces a protective skin which is impervious to oxygen and therefore stops further oxidation taking place until the surface material is removed, and this is utilized in chemiluminescent marking crayons. Certain chemiluminescent compounds have been utilized as indicators for the photometric titration of solutions of high opacity.

Chemiluminescence is not to be confused with the phenomenon which is conventionally described as "fluorescence," namely the absorption by certain chemical compounds of radiation at one wavelength and the subsequent emission of radiation at a longer wavelength. Hitherto much use has been made of fluorescent materials to provide visual effects, but such effects are of a lasting nature as a fluorescent material does not alter chemically when it emits light. For example, it is now common practice to include fluorescing agents, called optical brighteners, in household detergent powders; the fluorescing agent is deposited on fabrics during the washing process, and subsequently gives the fabrics a bright and clean appearance. A permanent fluorescent effect is also utilized in certain dyes and paints, which are used to provide striking visual effects in warning notices and advertisements.

Visual effects have been produced in particulate detergent compositions by the use of non-fluorescent pigments. All or part of a detergent powder can be colored, and thereby distinguished from other common household powdered materials.

The present invention provides a cleansing composition incorporating one or more chemical compounds that engage in a chemiluminescent reaction under the conditions of use of the cleansing composition.

Hereafter, the term "chemiluminescer" is used to mean a chemical compound which can directly contribute to a chemiluminescent reaction by being converted, during the course of the reaction, into an electronically excited species which can then either emit visible light itself, or transfer energy to a second chemical compound which can emit visible light.

Certain chemiluminescers can be converted into a suitable electronically excited species merely by, for instance, being exposed to the atmosphere or by being added to water. However, in general, it is necessary to incorporate into a cleansing composition of the invention one or more chemical compounds which will initiate or enhance in some way the chemiluminescent reaction, and hereafter any such compound is referred to as an "activator."

In a preferred embodiment of the invention, the chemical compounds that engage in a chemiluminescent reaction are a chemiluminescer together with one or more activators.

The cleansing compositions of the present invention, by virtue of their chemiluminescent properties, are capable of conveying to a user information on their behavior. Typical instances of such conveyance of information are (1) an indication that a spray material has satisfactorily covered a surface, or (2) an indication that a product has been allowed sufficient time to perform a necessary function.

There are many cleansing compositions that require to be left in contact with some substrate, when they are used, and in this context materials with chemiluminescent properties have great utility as job timers. Exemplary of such compositions are polishes, surface cleaners and surface disinfectants which require to be left in contact for a period of time with the surface to be treated, and enzymatic fabric washing compositions where it is intended that the fabric be soaked in the washing composition solution for some extended period. In such instances the composition can be made either to luminesce for a period of time such that cessation of the luminescence indicates that the recommended contact period has ended, or the commencement of the chemiluminescence can be made to occur at the termination of the required period and therefore the first appearance of the light gives an indication that the composition has been given sufficient time to perform its function.

The chemiluminescent effect may be used to indicate satisfactory dispersal of a composition through the atmosphere or satisfactory achievement of solution. Emission of light by an aerosol or spray composition released from a container into the air can indicate the volume of air that has been penetrated by the composition. When a solid composition is being dissolved a cessation of luminescence can be made to indicate that the composition has completely dissolved.

A major problem inherent in the incorporation according to the invention of chemiluminescent materials into cleansing compositions is delaying the onset of the chemiluminescent reaction until the signalling function is desired. It is necessary to have the composition in some form where the chemiluminescent function is latent, and to have some arrangement that will trigger off the light-producing reaction at the desired moment. Chemiluminescence may be initiated, for instance, by the action of water on a solid, by the mixing of liquid or by exposure to air. The latency of the chemiluminescent function may be maintained by the choice of suitable packaging and encapsulation techniques.

Although this is not an essential feature of the invention, various forms of encapsulation can be used to produce differing light releasing arrangements, and also to provide enhanced stability of any ingredient in any of the compositions according to the invention where this is deemed to be necessary. Encapsulation can provide compositions with, for instance, varying speeds of light release or pH- or temperature-dependent release arrangements.

The incorporation into a composition of a chemiluminescer or an activator coated such that it is only released above a certain temperature can enable a composition to be formulated that only emits light when a desired usage temperature has been achieved. For instance, a fabric washing powder can be made to emit light on solution only when added to water hot enough for efficient washing performance; alternatively, for example, the emission of light can be made to indicate that washing conditions are too hot for certain synthetic fabrics.

Pressure-rupturable capsules of chemiluminescent compounds, incorporated into, for example, a scouring powder, may be employed to indicate that the composition is being applied with sufficient vigor, the capsules being prepared so that they rupture (and thereby initiate the chemiluminescent reaction) when a certain pressure is exceeded.

As will be described below, certain chemiluminescent reactions only take place efficiently under strong oxidizing conditions, particularly those conditions frequently produced by bleaching compositions. Thus certain chemiluminescent reactions can be used to provide a positive indication that a bleaching action is taking place, thereby reassuring a user that a bleaching compositions is working efficiently and that it has not deteriorated during storage.

Sensitized luminescence occurs according to the present invention when a cleansing composition incorporates one or more fluorescent compounds, such as, for example, fluorescein, in addition to a chemiluminescent compound. This may be advantageous for two reasons. Firstly, the production of visible light may be enhanced by the presence of a fluorescent compound, particularly if the chemiluminescent compound emits light which is partially ultra-violet. Secondly, the color of the visible light emitted by the composition may be modified by careful selection of the fluorescent compound used. The net emission of light from any composition according to the invention is affected by all the luminescent species present in the composition, whether they be excited chemiluminescent molecules or excited fluorescent molecules.

Although a great number of chemical compounds are known to be capable of undergoing reactions during which chemiluminescence is generated, the choice of such compounds suitable for inclusion in compositions of the present invention is limited by several factors.

An important property of any chemiluminescer is its quantum yield, which is a measure of its efficiency as a light-producer in terms of the amount of light emitted per molecule of the chemiluminescer employed. In order to produce a visible effect in use, a cleansing composition of the invention must generate light of strong intensity. Since the primary function of a composition of the invention is to cleanse, the bulk of the composition will consist of materials required to perform the cleansing, and therefore the amount of chemiluminescer, and any necessary activators, employed in the composition must be kept to a minimum. Hence, those chemiluminescers which have a higher quantum yield, and are therefore efficient light-producers, are preferred.

In addition, since it is envisaged that a major proportion of the compositions in accordance with the present invention will be formulated or employed in aqueous media, any chemiluminescer incorporated into these compositions should ideally be water-soluble. This second factor introduces a further limitation, as chemiluminescent efficiencies are generally reduced in aqueous media and, in fact, many good chemiluminescent systems are completely inactive in aqueous media.

The great majority of compounds which are known to be capable of undergoing reactions which produce chemiluminescence have been found to be unsuitable for the present invention because they do not comply with the above requirements.

One group of compounds that does meet these requirements is the 2,3-dihydrophthalazine-1,4-diones of structural formulae II and III below.

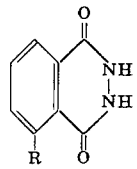 II

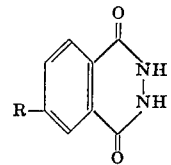 III wherein R can be any of the following groups:

NH$_2$
NHCH$_3$
NHC$_2$H$_5$
NHCH$_2$C$_6$H$_5$
NHCOCH$_2$Cl       (N-chloroacetamido)
NHCOCH$_2$NH$_2$   (N-glycylamido)
NHCOCH$_2$NHNH$_2$ (N-hydrazineacetiamido)
N(CH$_3$)$_2$
N(C$_2$H$_5$)$_2$
N(CH$_2$C$_6$H$_5$)$_2$ 5-Amino-2,3-dihydrophthalazine-1,4-dione (formula II wherein R = NH$_2$) is known as luminol.

It is sometimes preferable to utilize these compounds as their alkali-metal salts, generally as their monosodium salts, because these salts tend to be more readily water-soluble than the compounds themselves. The potassium or lithium salts can be employed instead of the sodium salts. The monosodium salt of luminol is believed to possess the structural formula IV.

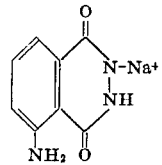 IV

These compounds chemiluminesce by means of the peroxide decomposition mechanism referred to earlier, and for this reaction to occur with sufficient efficiency for the purposes of the present invention they require the presence of two activators, one of which should be an oxidizing agent and the other should preferably be a halogen source.

Examples of oxidizing agents suitable as activators are: sodium perborate; potassium perborate; sodium percarbonate; hydrogen peroxide; zinc peroxide; barium peroxide; calcium peroxide; magnesium peroxide; the sodium, potassium, lithium and ammonium salts of the peroxyphosphates of orthophosphoric acid, pyrophosphoric acid and tripolyphosphoric acid; the peroxyhydrates of sodium sulphate and potassium sulphate; the sodium, potassium, lithium, calcium, magnesium and ammonium salts of the peroxyhydrates of α-amino phosphonic acids; and the hydrogen peroxide addition products of urea, biuret and amides.

Examples of halogen sources suitable as activators are: sodium hypochlorite; potassium hypochlorite; lithium hypochlorite; calcium hypochlorite; trisodium phosphate hypochlorite; trichlorocyanuric acid; sodium dichlorocyanurate; potassium dichlorocyanurate and dichlorocyanuric acid. Further examples of suitable halogen sources are active halogen compounds such as N-halohydantions, for instance N-monochloro-5-ethyl-3-methyl-hydantion, N,N'-dichloro-5-pentamethylene-hydantion, N,N'-dichloro-5-carboxyethyl-5-methyl-hydantion, N,N'-dichloro-dimethyl-hydantion, and analogous N-bromo and N-mixed halogen compounds; N-halomelamines, for instance $N^1,N^2,N^3$-trichloromelamine; N-halosulphonamides, for instance sodium N-chloro-benzenesulphonamide, sodium N-chloro-toluenesulphonamide, p-N,N-dichloro-sulphamyl benzoic acid, N,N'-dichloro-toluene-2,4-disulphonamide, and the corresponding N-bromo and N-mixed halogen compounds; N-haloglycolurils, for instance $N^1,N^3,N^4,N^6$-tetrachloro-2,5-diimino-7,8-dimethyl-glycoluril, $N^1,N^3,N^4$-trichloro-7,8-diphenyl-glycoluril and corresponding N-bromo and N-mixed halogen compounds; N-halohydrouracils; N-halodiketopiperazines; N-halobiguanides, for instance N-chlorinated-N-tetra-methyl-substituted biguanides; N-halogenated imides, for instance N-chloro-succinamide, N-chloro-phthalimide, N,N'-dichloro-pyromellitic diimide and N,N'-dichloro-bicyclo-azole-2,5-dione, and analogous N-bromo and N-mixed halogen compounds; N-haloquinazolinediones; N-halotriazines; and N-halogenated acid amides, for instance N-chloroacetamide, N,N'-dichlorosuccinamide, N,N'-dichloro-2-chloro-N,N'-dimethyl-adipic-diamide, N-chloro-N-methyl-benzamide, N,N'-dichlorophthalic-diamide, N,N'-dichloro-2-methoxy-N,N'-dimethyl-terephthalic-diamide, and corresponding N-bromo and N-mixed halogen compounds. Other halogen sources are disclosed in British Pat. No. 1,014,654.

Certain catalysts, such as haemin and transition metal organic complexes such as cobalt chelates of pyridine-2-carboxylic acid and 1,10-phenanthroline, can be employed as the second activator. The use of such catalysts will, in general, result in light emissions which are of somewhat longer duration and lower intensity than the light emission produced with the aid of halogen sources.

Although being suitable for inclusion in many cleansing compositions according to the invention, luminol possesses one disadvantageous characteristic in that it shows a tendency to undergo side reactions, believed to involve the amino group of the luminol molecule and the oxidizing agents necessary for the chemiluminescent reaction, and this can result in the formation of undesirable predominately brown-colored minor products. This discoloration has not been found to be a problem in cleansing compositions, such as fabric washing compositions, which are used at low concentrations and which generally contain bleaches such as sodium perborate which can counteract the effect of any such minor products that may be formed. The substituted amino-2,3-dihydrophthalazine-1,4-diones listed above show, in general, a lesser tendency to discolor, and in particular, the N-chloracetamido, N-glycylamido, N-hydrazineacetamido, diethyl and dibenzyl derivatives of 5-amino- and 6-amino-2,3-dihydrophthalazine-1,4-dione show little or no tendency to discolor. The chemiluminescent efficiency of these substituted compounds is, in general, less than that of luminol, and certain of them, notably the dibenzyl derivative, are noticeably less water-soluble than luminol. The factors governing the selection of the most suitable chemiluminescer for inclusion in any given cleansing composition will vary depending on the nature of the composition. For instance, in a fabric washing composition, water-solubility and chemiluminescent efficiency may be considered to be the overriding factors, whereas in, for instance, a hard surface cleaning composition, water-solubility may be considered less significant, but lack of discoloration may be of utmost importance. However, the man skilled in the art of formulating cleansing compositions will be familiar with such considerations, and will be able to select the chemiluminescer most appropriate for his needs.

As has already been stated above, the quantity of chemiluminescer in a cleansing composition should be kept to a minimum consistent with obtaining an effective chemiluminescent effect, as, in general, a chemiluminescer will not directly partake in the cleansing operation which is the primary function of the composition. The chemiluminescer should comprise from about 0.05 to about 10 percent, preferably from about 0.1 to about 2.5 percent, by weight of the cleansing composition.

An activator should comprise a similar proportion of the cleansing composition, unless it is a conventional ingredient of the composition, in which case it may well be present in a considerably greater amount. For instance, fabric washing compositions frequently contain oxidizing agents, such as sodium perborate and sodium percarbonate, in amounts varying from about 5 to about 40 percent by weight of the composition. In such instances, if the oxidizing agent is an activator for the particular chemiluminescer employed in the composition, no additional oxidizing agent is likely to be required.

If it is desired that, either for the purposes of composition stability or for the control of the chemiluminescent reaction, some or all of the compounds involved in the chemiluminescent reaction be protected by, for instance, being encapsulated or contained within a noodle, the coating material should preferably be a substance that will assist, or at least will not adversely affect, the cleansing ability of the composition. Coating techniques are now well known and commonly used in the cleansing composition art, and it will be within the capabilities of the man skilled in this art to apply these techniques to the present invention.

The present invention is applicable to any type of conventional cleansing composition and, apart from the inclusion of the chemiluminescer, and activators if necessary, there will in general be no need to alter the formulation of any particular cleansing composition in order to adapt it to emit light in accordance with the invention. In the case of certain liquid compositions it may be necessary to divide a composition into two or more separate fractions, and to package the composition such that the fractions are kept separate until the composition is dispensed, ready for use, in order to retain the latency or stability of the chemiluminescent action, but no overall change in the formulation of the composition should be required.

A fabric washing composition adapted in accordance with the invention can be in any of the common physical forms associated with such a composition, such as a powder, granules, noodles, flakes, briquettes, tablets, bars or liquids. The composition can be made in any of the conventional ways of preparing fabric washing compositions; in the case of a particulate composition this will in general involve slurry-making and spray-drying steps, and it will be usual for the chemiluminescer and activators to be dry-dosed into the powder after the spray-drying step.

A fabric washing composition can contain any of the usual ingredients of such compositions, such as detergent active agents, foam boosters, detergency builders, inorganic salts acting as fillers, corrosion inhibitors, bleaches, and, usually present in minor amounts, bleach activators, bleach precursors, perfumes, germicides, enzymes, fluorescers, pigments and antiredeposition agents. The detergent active agents can include anionic detergent active agents such as alkali-metal fatty acid soaps, derived from fatty acids obtained from natural fats and oils such as tallows, palm kernel oil, groundnut oil, tall oil, coconut oil and babassu oil, and from synthetic fatty acids, alkali-metal alkyl aryl sulphonates, for instance, sodium dodecyl benzene sulphonate, alkali-metal alkyl sulphonates, alkali-metal fatty acid isethionates, alkali-metal alkyl sulphates, for instance, sodium tallow sulphate, mixtures of anionic detergent active agents (commonly called olefin sulphonates) derived from the sulphonation with sulphur trioxide, and subsequent neutralization and hydrolysis, of alpha-olefins, and alkali-metal sulphates of ethoxylated alcohols; non-ionic detergent active agents such as ethyoxylated alkyl phenols, ethoxylated alcohols, ethoxylated amines and ethoxylated amides and detergent active agents derived from other alkylene oxides, such as propylene oxide, either alone or in conjunction with ethylene oxide; cationic detergent active agents such as quaternary ammonium compounds, for instance alkyl trimethyl ammonium halides and dialkyl dimethyl ammonium halides, and ethoxylated quaternary ammonium compounds; and zwitterionic detergent active agents such as betaines, sulphobentaines, taurines, for instance hydroxyalkyl methyl taurines, and amine oxides. The foam boosters are usually ethoxylated fatty acid amides such as palm kernel mono-ethanolamide and coconut di-ethanolamide. The detergency builders may be condensed phosphates such as sodium tripolyphosphate, sodium pyrophosphate and sodium hexametaphosphate, simple phosphates such as sodium orthophosphate, and non-phosphate materials such as sodium nitrilotriacetate, sodium metasilicate, sodium ethylenediaminetetraacetate, and sodium alkyl dicarboxylates. The inorganic salts are generally sodium sulphate, sodium carbonate and magnesium sulphate. The bleaches are conventionally sodium perborate and sodium percarbonate.

Hard-surface cleansing compositions are another group of cleansing compositions particularly suited to the inclusion of a chemiluminescent effect. Dry particulate compositions, such as scouring powders, are most easily adapted to emit light, as their anhydrous nature aids the stability and latency of the chemiluminescent effect. A scouring powder typically contains one or more detergent active agents, such as those listed above, a chlorine source such as trichloroisocyanuric acid, and a large proportion frequently about 90 percent by weight, of an abrasive powder such as finely crushed silica, calcite or felspar. Liquid compositions, such as dishwashing compositions and liquid abrasive compositions, can either be non-aqueous in character, in which case one or more of the agents necessary to produce the chemiluminescent effect can be, for instance, encapsulated in a water-soluble material so that the chemiluminescent effect is only initiated on addition of the composition to water, or, in the case of water-based compositions, the compositions can be stored in divided packages so that the chemiluminescent effect is not initiated until the compositions are dispensed. Dishwashing compositions are generally water-based, and contain detergent active agents, solvents (hydrotropes) and minor ingredients such as perfumes and colorants in addition to the water.

Aerosol and spray compositions, such as air fresheners, insecticidal sprays for domestic use and germicidal sprays for disinfecting surfaces, generally comprise the necessary active ingredients (germicides, insecticides and perfumes) together with solvents such as glycols, aliphatic alcohols and water. They can be dispensed in aerosol form from pressurized containers with the aid of aerosol propellants, such as halogenated hydrocarbons, for instance, dichlorodifluoromethane and dichlorotetrafluoroethane, and hydrocarbons, for instance, propane, butanes and pentanes, or they can be dispensed in spray form by means of a manually operated pump.

If a cleansing composition of the invention includes detergent active material, the detergent active material will in general comprise from about 0.5 to about 60 percent by weight of the composition.

The following examples, in which all parts and percentages are by weight, illustrate various cleansing compositions in accordance with the invention.

EXAMPLE 1

A detergent powder, prepared by conventional slurry-making and spray-drying techniques and having the following formulation:

| Component | Parts |
| --- | --- |
| Sodium dodecyl benzene sulphonate | 17 |
| Coconut ethanolamide | 2 |
| Sodium tripolyphosphate | 32 |
| Sodium perborate | 20 |
| Anhydrous alkaline sodium silicate | 8 |
| Sodium sulphate | 12 |
| Fluorescers, perfumes, antiredeposition agents and water to | 100 | was subsequently dosed with:

| Additive | Parts/100 parts of the above powder |
| --- | --- |
| Noodled chemiluminescer[1] | 2 |
| Coated activator[2] | 1.5 |

[1] The chemiluminescer was sodium 5-amino-2,3-dihydrophthalazine-1,4-dione, and the noodles were made from 1 part of the chemiluminescer and 1 part of potassium coconut soap. The noodles were prepared using a Simon-Heesen press.
[2] The activator was trichlorocyanuric acid and the coating material was a 3:1 mixture of lauric acid and paraffin wax, the mixture melting at approximately 40° C. The coated activator particles consisted of about 65 parts of the activator and about 35 parts of the coating material, and were prepared using a conventional fluidized bed technique.

When the powder was sprinkled into water at a temperature of less than 35° C, it behaved like any conventional powder. It dissolved and produced a lather when the water was agitated, but gave rise to no unusual visual effects.

However, when added to water at a temperature of at least 40° C, the melting point of the activator coating material, a few flashes of blue light were seen as soon as the powder hit the water. However, after a few seconds had elapsed and the coating material had melted, a strong emission of blue light was observed when the surface of the water was agitated. The light was clearly visible in daylight. Although the light emission ceased very rapidly whenever the agitation of the water was stopped, further agitation of the water produced light up to about 10 minutes after the addition of the powder to the water. When viewed in subdued daylight, the visual effects were even more pronounced, and at times the whole body of the wash solution was observed to emit light.

Although luminol was used as the chemiluminescer in this example, no discoloration of the wash solution was observed.

The recommended temperature for hand-washing laundry, using the above detergent powder formulation, is 40°–45° C. Therefore the presence of the chemiluminescent effect gave a positive indication that the washing temperature was not below the recommended temperature.

The detergent powder of this example gave a washing performance comparable with that of conventional detergent powders, and the presence of the chemiluminescer and the activator produced no adverse effects.

EXAMPLE 2

A soap powder, prepared by conventional slurry-making and spray-drying techniques and having the following formulation:

| Component | Parts |
| --- | --- |
| Anhydrous sodium soap[1] | 54 |
| Tallow ethanolamide | 3 |
| Sodium tripolyphosphate | 12 |
| Neutral sodium silicate | 8 |
| Sodium perborate | 10 |
| Fluorescers, perfumes, antiredeposition agents and water to | 100 | was subsequently dosed with:

| Additive | Parts/100 parts of the above powder |
| --- | --- |
| Noodled chemiluminescer[2] | 2 |
| Coated activator[3] | 1.5 |

¹Consisting of 80 percent tallow soap and 20 percent coconut soap
²The chemiluminescer was sodium 5-amino-2,3-dihydrophthalazine-1,4-dione, and the noodles were made from 1 part of the chemiluminescer and 1 part of potassium coconut soap. The noodles were prepared using a Simon-Heesen press.
³The activator was trichlorocyanuric acid and the coating material was a 3:1 mixture of lauric acid and paraffin wax, the mixture melting at approximately 40° C. The coated activator particles consisted of about 65 parts of the activator and about 35 parts of the coating material, and were prepared using a conventional fluidized bed technique.

This soap powder behaved similarly to the detergent powder of Example 1, giving a strong chemiluminescent effect in water above 40° C, but giving no significant visual effects below that temperature. As before, the presence of the chemiluminescent effect indicated that the washing temperature was not below the minimum ideal temperature for a hand wash.

As in Example 1, there were no observable discoloration effects even though luminol was employed as the chemiluminescer.

The washing performance of this soap powder compared very favorably with that of conventional soap powders, and the presence of the chemiluminescer and the activator produced no adverse effects.

EXAMPLE 3

A mixed-active detergent powder, prepared by conventional slurry-making and spray-drying techniques and having the following formulation:

| Component | Parts |
| --- | --- |
| Sodium dodecyl benzene sulphonate | 6 |
| Tallow alcohol 18 ethylene oxide condensate | 4 |
| Anhydrous sodium soap¹ | 8 |
| Sodium tripolyphosphate | 33 |
| Sodium perborate | 25 |
| Anhydrous alkaline sodium silicate | 5 |
| Sodium sulphate | 8 |
| Fluorescers, perfumes, antiredeposition agents and water to | 100 | was subsequently dosed with:

| Additive | Parts/100 parts of the above powder |
| --- | --- |
| Noodled chemiluminescer² | 2 |
| Coated activator³ | 1.5 |

¹Consisting of sodium hardened tallow soap.
²The chemiluminescer was sodium 5-amino-2,3-dihydrophthalazine-1,4-dione, and the noodles were made from 1 part of the chemiluminescer and 1 part of potassium coconut soap. The noodles were prepared using a Simon-Heesen press.
³The activator was trichlorocyanuric acid and the coating material was a 3:1 mixture of palmitic acid and paraffin wax, the mixture melting at approximately 50° C. The coated activator particles consisted of about 65 parts of the activator and about 35 parts of the coating material, and were prepared using a conventional fluidized bed technique.

The release temperature for the activator was 50° C, and so this detergent powder was inactive, as far as the generation of a chemiluminescent effect was concerned, in water at a temperature of less than about 50° C. 50°–55° C is a common optimum working temperature for many fabric washing machines, and so a chemiluminescent effect which is produced only at or above this temperature can give an indication that a washing machine, adapted to wash at this temperature, is working efficiently.

When added to water, this powder behaved similarly to the powders of Examples 1 and 2, except that no chemiluminescent effects were seen in water below about 50° C.

This powder also gave a good washing performance which was not adversely affected by the presence of the chemiluminescer and the activator, and no discoloration of the wash solution was observed.

EXAMPLE 4

A detergent powder, prepared by conventional slurry-making and spray-drying techniques and having the following formulation:

| Component | Parts |
| --- | --- |
| Fatty alcohol ethoxylate | 15 |
| Anhydrous sodium soap¹ | 2 |
| Sodium tripolyphosphate | 40 |
| Sodium perborate | 25 |
| Anhydrous alkaline sodium silicate | 7 |
| Fluorescers, perfumes, antiredeposition agents and water to | 100 | was subsequently dosed with:

| Additive | Parts/100 parts of the above powder |
| --- | --- |
| Noodled chemiluminescer² | 2 |
| Coated activator³ | 1.5 |

¹Consisting of 80 percent tallow soap and 20 percent coconut soap.
²The chemiluminescer was sodium 5-amino-2,3-dihydrophthalazine-1,4-dione, and the noodles were made from 1 part of the chemiluminescer and 1 part of potassium coconut soap. The noodles were prepared using a Simon-Heesen press.
³The activator was trichlorocyanuric acid and the coating material was a 3:1 mixture of palmitic acid and paraffin wax, the mixture melting at approximately 50° C. The coated activator particles consisted of about 65 parts of the activator and about 35 parts of the coating material, and were prepared using a conventional fluidized bed technique.

This detergent powder behaved similarly to that of Example 3. It also produced a good washing performance which was not affected in any adverse way by the presence of the chemiluminescer and the activator, and produced no discoloration of the wash solution

EXAMPLES 5–7

The undosed detergent powder of Example 1 was dosed with

| Additive | Parts/100 parts of the powder |
| --- | --- |
| Noodled chemiluminescer¹ | 2 |
| Activator² | 1 |

¹The chemiluminescer was sodium 5-amino-2,3-dihydrophthalazine-1,4-dione, and the noodles were made from 1 part of the chemiluminescer and 1 part of potassium coconut soap. The noodles were prepared using a Simon-Heesen press.
²Example 5: trichlorocyanuric acid (uncoated)
Example 6: dichloro glycoluril (uncoated)
Example 7: dichloro dimethylhydantoin (uncoated)

Unlike the powders of Examples 1–4, which only emitted light after being added to warm water, the powders of Examples 5–7 produced a strong blue light immediately on being added to cold water.

The intensity of the light produced by the powder of Example 5 was similar to that produced by the powders of the four previous examples. However, the powders of Examples 6 and 7, which incorporated different chlorine sources as activators, produced light emission of greater intensity and longer duration than that of Example 5.

Examples 5–7 illustrate that different activators can produce different chemiluminescent effects.

As the chemiluminescent effect could only be produced under oxidizing conditions, the emission of the light showed that the powders of Examples 5–7 possessed a bleaching ability.

The activators used in Examples 6 and 7 could have been coated as in Examples 1–4, and thereby made to give an indication of the washing temperature.

EXAMPLE 8

An air-freshener/germicidal composition was prepared by simple admixture of the following components:

| Component | Parts |
| --- | --- |
| Cetyl trimethylammonium bromide | 1 |
| Oleyl di-betahydroxyethyl methylammonium methosulphate | 1.5 |
| Propylene glycol | 10 |
| Triethylene glycol | 10 |
| Isopropyl alcohol | 65 |
| Perfume | 1 |
| Water to | 100 |

To this was added:

| Additive | Parts/100 parts of the above composition |
| --- | --- |
| Chemiluminescer[1] | 0.5 |
| Activator[2] | 0.5 |

[1] The monosodium salt of 5-amino-2,3-dihydrophthalazine-1,4-dione.
[2] 20-volume aqueous hydrogen peroxide (expressed as 100 percent hydrogen peroxide).

The mixture was stored in one compartment of a divided two-compartment package fitted with a manually-operable pump adapted to deliver equal quantities of liquid from each compartment of the package simultaneously to a spray nozzle. The second compartment of the package contained a dilute aqueous solution of sodium hypochlorite having 0.5 percent available chlorine.

When the pump was operated, the contents of the two compartments were mixed in the nozzle, and emerged as a luminous blue spray. The blue light persisted for about 1 second, and was clearly visible in daylight. When the spray was directed into the air, the luminous nature of the spray gave an indication of the volume penetrated by the spray. When the spray was directed onto a surface, the light gave a very positive indication of the area covered by the spray.

Any mutually compatible germicides, solvents and perfumes could have been used in this example. Also, the composition could have been packaged in a two-compartment aerosol dispenser instead of a pump-operated dispenser.

EXAMPLE 9

An aerosol hard-surface cleaner was made up as follows:

40 ml of an aqueous solution of sodium hypochlorite, containing 33 percent by weight of sodium hypochlorite and having 15 percent available chlorine, was placed in the center compartment of a two-compartment 16 oz. aerosol can fitted with a Du Pont dual dispensing valve. In the outer compartment of the can was placed 250 ml of a solution having the following constitution:

| Component | Amount |
| --- | --- |
| Water | 850 ml |
| 10-volume hydrogen peroxide | 10 ml |
| 6-dimethylamino-2,3-dihydrophthalazine-1,4-dione | 1 gm |
| Sodium hydroxide | 2 gm |

The can was charged with 50 ml of a 1:1 mixture of dichlorodifluoro methane (I.C.I. Freon 12) and dichlorotetrafluoroethane (I.C.I. Freon 114).

On discharge, the contents of the two compartments mixed and emerged from the can as a luminous blue foam. The blue light faded rapidly after the foam had emerged from the can. But, because the chemiluminescent reaction can only take place under strong bleaching conditions, the emission of the light gave an indication that the foam possessed strong bleaching and germicidal properties.

EXAMPLES 10–15

To a scouring powder having the following constitution:

| Component | Parts |
| --- | --- |
| Sodium dodecyl benzene sulphonate | 3.7 |
| Sodium sulphate and sodium chloride | 1 |
| Sodium tripolyphosphate | 2 |
| Soda ash | 1 |
| Trichlorocyanuric acid | 1 |
| Perfume | 0.5 |
| Crushed felspar | 90 |
| Water to | 100 | were added the following additives:

| Additive | Parts/100 parts of the above powder |
| --- | --- |
| Chemiluminescer[1] | 1 |
| Sodium percarbonate | 2 |

[1] Example 10: 5-amino-2,3-dihydrophthalazine-1,4-dione.
Example 11: 6-amino-2,3-dihydrophthalazine-1,4-dione.
Example 12: 6-monoethylamino-2,3-dihydrophthalazine-1,4-dione.
Example 13: 6-dimethylamino-2,3-dihydrophthalazine-1,4-dione.
Example 14: 6-diethylamino-2,3-dihydrophthalazine-1,4-dione.
Example 15: 6-dibenzylamino-2,3-dihydrophthalazine-1,4-dione.

The chemiluminescent properties of these scouring powders were compared by using them to clean a white enamel kitchen sink.

The powders of Examples 10 and 11 both produced a strong blue light when rubbed on the moist surface of the sink. The powders, which were initially white, rapidly became light brown in color due to side reactions involving the chemiluminescer. However, this brown discoloration did not have any adverse effect on the cleaning ability of the powders.

The powder of Example 12 produced light of similar intensity to that produced by the two previous powders, but the degree of the brown discoloration was slightly less.

The powders of Examples 13 and 14 produced less light than did the powder of Example 12, although the light was still clearly visible in daylight. However, the powder of Example 13 was discolored to a negligible extent only, and the powder of Example 14 did not appear to be discolored at all.

The powder of Example 15 only produced a faint blue light, but this was still visible in daylight. There was no observable discoloration of this powder.

All of the above scouring powders were very efficient cleaners. Any discoloration of the powders did not affect their overall cleaning ability and the brown color was washed away when the remains of the powders were washed away after use.

The emission of the blue light indicated that the powders possessed strong bleaching and cleaning ability.

EXAMPLES 16–25

To a scouring powder having the following constitution:

| Component | Parts |
| --- | --- |
| Sodium dodecyl benzene sulphonate | 3.7 |
| Sodium sulphate and sodium chloride | 1 |
| Sodium tripolyphosphate | 2 |
| Soda ash | 1 |
| Trichlorocyanuric acid | 0.6 |
| Perfume | 0.5 |

| | | |
|---|---|---|
| Crushed felspar | 90 | |
| Water to | 100 | | were added the following additives (in parts/100 parts of the above powder)

| Example | Chemiluminescer[1] | Sodium percarbonate |
|---|---|---|
| 16 | 1.0 | 2 |
| 17 | 0.5 | 2 |
| 18 | 0.2 | 2 |
| 19 | 0.1 | 2 |
| 20 | 0.05 | 2 |
| 21 | 1.0 | 5 |
| 22 | 0.5 | 5 |
| 23 | 0.2 | 5 |
| 24 | 0.1 | 5 |
| 25 | 0.05 | 5 |

[1] 5-amino-2,3-dihydrophthalazine-1,4-dione.

The powders of Examples 16–25 were tested by being used to clean a white enamel kitchen sink.

The powders of Examples 16–18 all produced a strong blue light when rubbed on the wet surface of the sink. The intensity of the light emitted by the powder of Example 18 was lower than that of the two previous powders, but not significantly so. All three powders became light brown in color during use, but, as in Examples 10–14, this brown discoloration did not affect the overall cleaning ability of the powders, and was washed away easily after use. The degree of discoloration of the powder of Example 18 was slightly less than that of the two previous powders.

The intensity of the light emitted by the powder of Example 19 was noticeably less than that emitted by the powders of Examples 16–18, but the powder was only slightly discolored during use.

The powder of Example 20 produced a very faint blue light, but this was still visible in daylight. This powder was not noticeably discolored during use.

The powders of Examples 21–25, incorporating a larger amount of oxidizing agent, generally behaved in a similar manner to the corresponding powders of Examples 16–20. The light emitted by these powders was slightly more intense than that emitted by the previous powders, although the degree of discoloration generally remained the same.

EXAMPLE 26

The undosed detergent powder of Example 1 was dosed with

| Additive | Parts/100 parts of the powder |
|---|---|
| Noodled chemiluminescer[1] | 2 |
| Activator[2] | 1 |

[1] The chemiluminescer was sodium 5-amino-2,3-dihydrophthalazine-1,4-dione, and the noodles were made from 1 part of the chemiluminescer and 1 part of potassium coconut soap. The noodles were prepared using a Simon-Heesen press.
[2] A chlorine-exchange resin formed from a urea-melamine-formaldehyde resin, having 34 percent available chlorine.

This powder behaved similarly to those of Examples 5–7.

EXAMPLES 27 AND 28

To a scouring powder having the following constitution:

| Component | Parts |
|---|---|
| Sodium dodecyl benzene sulphonate | 3.5 |
| Sodium sulphate and sodium chloride | 1 |
| Sodium tripolyphosphate | 2 |
| Soda ash | 1 |
| Perfume | 0.5 |
| Crushed felspar | 91 |
| Water to | 100 | were added the following additives:

| Additive | Parts/100 parts of the above powder |
|---|---|
| Chemiluminescer[1] | 1 |
| First activator[2] | 2 |
| Second activator[3] | 1 |

[1] Example 27 - 5-amino-2,3-dihydrophthalazine-1,4-dione.
Example 28 - 6-diethylamino-2,3-dihydrophthalazine-1,4-dione.
[2] Sodium percarbonate.
[3] A chlorine-exchange resin formed from a urea-melamine-formaldehyde resin, having 34 percent available chlorine.

The powder of Example 27 behaved similarly to that of Example 10, giving a strong emission of light when coming into contact with water. It became discolored during use, although this discoloration did not affect its overall cleaning ability.

The powder of Example 28 emitted less light than did that of Example 27, but was not discolored during use.

We claim:

1. A chemiluminescent detergent composition consisting essentially of, by weight:

a. from about 0.05 to about 10 percent of a chemiluminescer selected from the group consisting of chemical compounds having the structural formula:

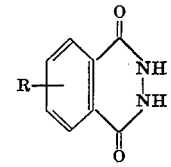

and sodium, potassium and lithium salts thereof, wherein R is selected from the group consisting of:
   $NH_2$
   $NHCH_3$
   $NHC_2H_5$
   $NHCH_2C_6H_5$
   $NHCOCH_2Cl$
   $NHCOCH_2NH_2$
   $N(CH_3)_2$
   $N(C_2H_5)_2$, and
   $N(CH_2C_6H_5)_2$;

b. from about 0.05 to about 40 percent of an oxidizing agent selected from the group consisting of sodium perborate, potassium perborate, sodium percarbonate, hydrogen peroxide, zinc peroxide, barium peroxide, calcium peroxide, magnesium peroxide, the sodium, potassium, lithium and ammonium salts of the peroxyphosphates of orthophosphoric acid, pyrophosphoric acid and tripolyphosphoric acid, the peroxyhydrates of sodium sulphate and potassium sulphate, the sodium, potassium, lithium, calcium, magnesium and ammonium salts of the peroxyhydrates of alpha-amino phosphoric acids and the hydrogen peroxide addition products of urea, biuret and amides;

c. from about 0.05 to about 10 percent of a halogen source; and d. from about 0.5 to about 60 percent of a detergent active material selected from the group consisting of anionic, nonionic, cationic and zwitterionic detergent active materials, said chemiluminescer being maintained out of contact with said halogen source until said composition is dispensed.

2. A chemiluminescent detergent composition according to claim 1 wherein said chemiluminescer comprises from about 0.1 to about 2.5 percent by weight of said chemiluminescent detergent composition, said oxidizing agent comprises from about 0.1 to about 40 percent by weight of said chemiluminescent detergent composition, and said halogen source comprises from about 0.1 to about 2.5 percent by weight of said chemiluminescent detergent composition.

3. A chemiluminescent detergent composition according to claim 2 wherein said halogen source is a chlorine source.

4. A chemiluminescent detergent composition according to claim 1, wherein
   a. said chemiluminescer comprises from about 0.1 to about 2.5 percent by weight of said chemiluminescent detergent composition, and is selected from the group consisting of chemical compounds having the structural formula:

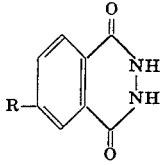

and sodium, potassium and lithium salts thereof, wherein R is selected from the group consisting of:
   $NH_2$
   $NHCH_3$
   $NHC_2H_5$
   $N(CH_3)_2$, and
   $N(C_2H_5)_2$
   b. said oxidizing agent comprises from about 0.1 to about 40 percent by weight of said chemiluminescent detergent composition, and is selected from the group consisting of sodium perborate, potassium perborate, sodium percarbonate and hydrogen peroxide; and
   c. said halogen source comprises from about 0.1 to about 2.5 percent by weight of said chemiluminescent detergent composition, and is selected from the group consisting of sodium hypochlorite, potassium hypochlorite, lithium hypochlorite, calcium hypochlorite, trichloroisocyanuric acid, dichloroisocyanuric acid, sodium dichloroisocyanurate, potassium dichloroisocyanurate, dichloro glycolurils, dichloro dimethyl hydantoins, and chlorine-exchange resins.

5. A chemiluminescent detergent composition according to claim 1, wherein said detergent composition is in powder form.

6. A chemiluminescent detergent composition according to claim 1, wherein said detergent composition is in liquid form.

7. A substantially dry scouring powder comprising about 90 parts by weight of an abrasive powder, the balance being a detergent composition comprising
   a. a detergent material selected from the group consisting of anionic, nonionic, cationic, and zwitterionic detergent active materials,
   b. a chemiluminescer selected from the group consisting of chemical compounds having the structural formula:

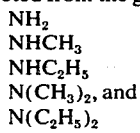

and sodium, potassium and lithium salts thereof, wherein R is selected from the group consisting of:
   $NH_2$
   $NHCH_3$
   $NHC_2H_5$
   $NHCH_2C_6H_5$
   $NHCOCH_2Cl$
   $NHCOCH_2NH_2$
   $N(CH_3)_2$
   $N(C_2H_5)_2$, and
   $N(CH_2C_6H_5)_2$, c. an oxidizing agent selected from the group consisting of sodium perborate, potassium perborate, sodium percarbonate, hydrogen peroxide, zinc peroxide, barium peroxide, calcium peroxide, magnesium peroxide, the sodium, potassium, lithium and ammonium salts of the peroxyphosphates of orthophosphoric acid, pyrophosphoric acid and tripolyphosphoric acid, the peroxyhydrates of sodium sulphate and potassium sulphate, the sodium, potassium, lithium, calcium, magnesium and ammonium salts of the peroxyhydrates of alpha-amino phosphoric acids and the hydrogen peroxide addition products of urea, biuret and amides, and
   d. a halogen source,
   said chemiluminescer, oxidizing agent, and halogen source being present in proportions by weight respectively of about 1 part, about 2–5 parts, and about 0.6–1 part for 100 parts of said scouring powder.

8. A scouring powder in accordance with claim 7 wherein said chemiluminescer is encapsulated in pressure-rupturable capsules.

9. A chemiluminescent detergent composition comprising, by weight:
   a. from about 0.05 to about 10 percent of a chemiluminescer selected from the group consisting of chemical compounds having the structural formula:

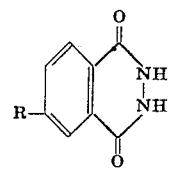

and sodium, potassium and lithium salts thereof, wherein R is selected from the group consisting of:
   $NH_2$
   $NHCH_3$
   $NHC_2H_5$
   $NHCH_2C_6H_5$
   $NHCOCH_2Cl$
   $NHCOCH_2NH_2$
   $N(CH_3)_2$
   $N(C_2H_5)_2$, and
   $N(CH_2C_6H_5)_2$,
   b. about 0.05 to about 40 percent of a first activator for said chemiluminescer which is an oxidizing agent selected from the group consisting of sodium perborate, potassium perborate, sodium percarbonate, hydrogen peroxide, zinc peroxide, barium peroxide, calcium peroxide, magnesium peroxide, the sodium, potassium, lithium and ammonium salts of the peroxyphosphates of orthophosphoric acid, pyrophosphoric acid and tripolyphosphoric acid, the peroxyhydrates of sodium sulphate and potassium sulphate, the sodium, potassium, lithium, calcium, mangesium and ammonium salts of the peroxyhydrates of alphaamino phosphoric acids and the hydrogen peroxide addition products of urea, biuret and amides,
   c. from about 0.05 to about 10 percent of a second activator for said chemiluminescer selected from the group consisting of a transition metal chelate of pyridine-2-carboxylic acid, and a transition metal chelate of 1,10-phenanthroline, and
   d. from about 0.5 to about 60 percent of a detergent active material selected from the group consisting of anionic, nonionic, cationic and zwitterionic detergent active materials, said chemiluminescer being maintained out of contact with said activators until said composition is dispensed.

10. A chemiluminescent air-freshener/germicidal composition contained in a divided two-compartment package having a first and a second compartment, said first compartment containing a solution of, in parts by weight:

| | |
|---|---|
| Cetyl trimethylammonium bromide | 1 |
| Oleyl di-betahydroxyethyl methyl- | |

| | |
|---|---|
| ammonium methosulphate | 1.5 |
| Propylene glycol | 10 |
| Triethylene glycol | 10 |
| Isopropyl alcohol | 65 |
| Perfume | 1 |
| Water | 11.5 | and 0.5 part by weight of said solution each of the monosodium salt of 5-amino-2,3-dihydrophthalazine-1,4-dione, and $H_2O_2$, and said second compartment containing an aqueous solution of sodium hypochlorite, said solution having 0.5 percent available chlorine.

* * * * *